T. J. JOLLY.
Hay Loader.
No. 28,868.
2 Sheets—Sheet 2.
Patented June 26, 1860.
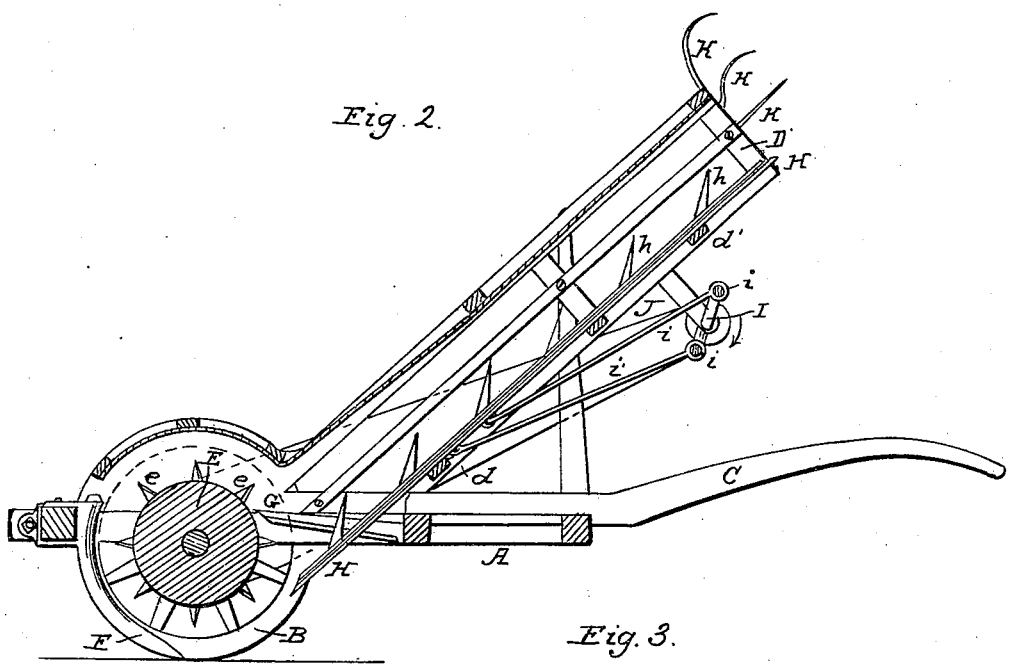
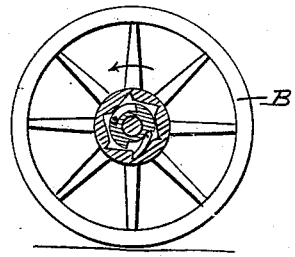
Witnesses:
Inventor
T. J. Jolly

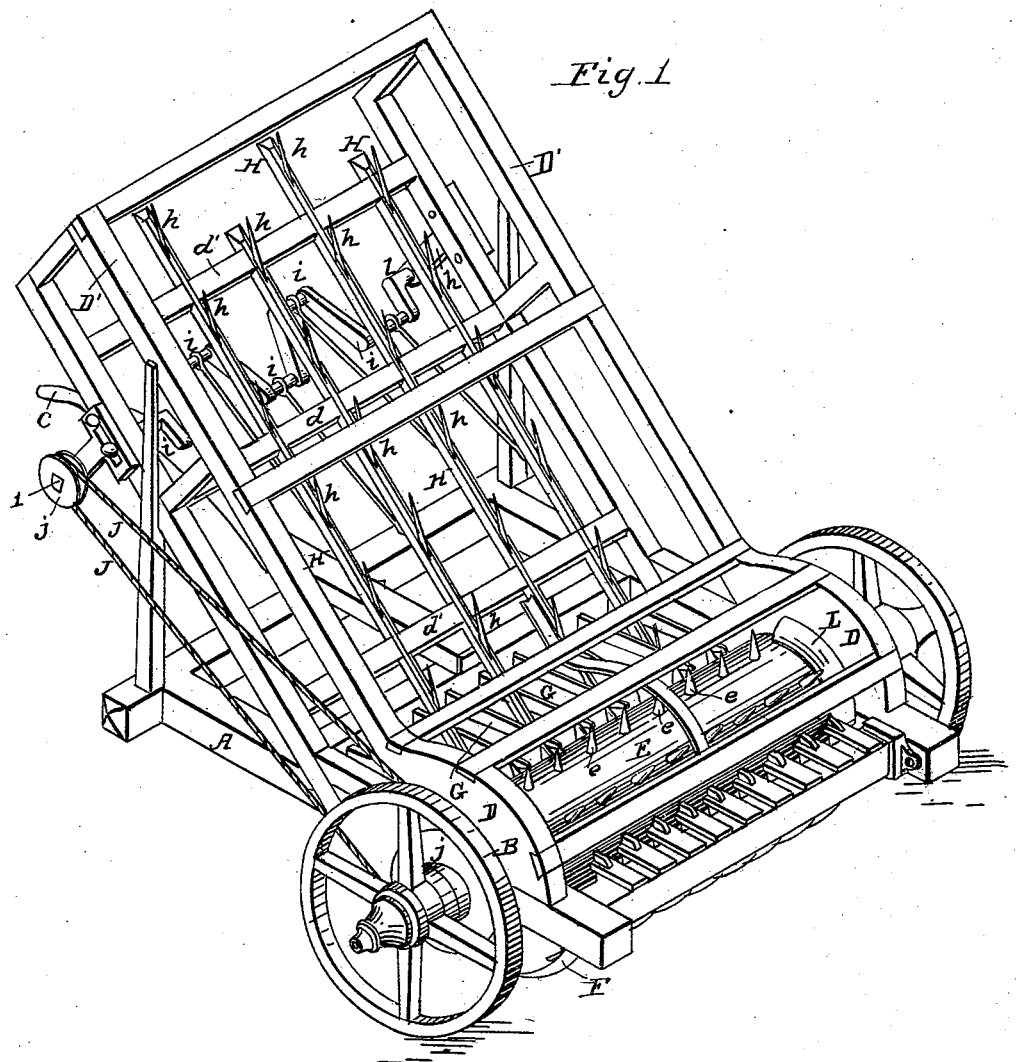

UNITED STATES PATENT OFFICE.

THOMAS J. JOLLY, OF OLEAN, INDIANA.

IMPROVEMENT IN LOADING HAY.

Specification forming part of Letters Patent No. 28,868, dated June 26, 1860.

*To all whom it may concern:*

Be it known that I, THOMAS J. JOLLY, of Olean, Ripley county, Indiana, have invented a certain new and useful Improvement in Machines for Raking and Loading Hay; and I hereby declare the following to be a full, clear, and exact description of the same, reference being had to the accompanying drawings, making part of this specification, and in which—

Figure 1 is a perspective view of a machine embodying my invention.. Fig. 2 is a longitudinal sectional elevation thereof. Fig. 3 is an inside view of one of the wheels.

A is a frame supported on a pair of ground-wheels, B, and provided with a tongue, C, for attachment to the rear end of a wagon-bed.

D D' is an open-work grid or cradle, whose lower portion is nearly semi-cylindrical and concentric with the axle of the wheel B, and whose upper portion, D', inclines forward and upward at an angle of about forty-five degrees. E is a cylinder rigidly attached to the axle within the frame, and armed with spikes e.

Projecting downward and forward from the rear rail of the frame is a series of curved teeth, F, nearly concentric with the cylinder E. Projecting rearward and slightly upward from the front rail of the frame A is a series of pointed rods forming a rack, G.

The cross-rails d' on the under side of the cradle D' are mortised to receive rods H, armed on their upper sides with teeth h.

I is a crank-shaft journaled to the frame, and rotated by belt J and pulleys j from the ground-wheels. Each crank i is connected by rod i' to one of the rods H, so that the rotation of the shaft I causes every alternate rod to advance while the intermediate ones retreat, and vice versa. Curved fingers K, around the top edges of the cradle, serve to prevent the scattering of hay by the wind. Each ground-wheel is provided with a ratchet-movement (see Fig. 3) to impart its forward rotation to the axle, but permit a free retrograde motion of either one or both wheels when necessary. Guards L prevent the entrance of hay between the frame and the wheel-hub.

The operation is as follows: The implement being attached to the rear end of a wagon, and being drawn forward therewith, the spiked cylinder E takes the hay as it collects upon the teeth F and conveys it to the rack G, whence the hooked rods H h push it up and over the top edge of the cradle D' d' into the wagon. The reciprocating rods H h discharge the hay without tangling it, and are not liable to give it a retrograte motion, as is the case with the lower portion of an endless apron.

I claim as new and of my invention herein and desire to secure by Letters Patent—

The reciprocating toothed rods H, constructed and operating in combination with gathering mechanism E F G, in manner substantially as and for the purposes set forth.

In testimony of which invention I hereunto set my hand.

T. J. JOLLY.

Witnesses:
GEO. H. KNIGHT,
C. STUMER, JR.